July 15, 1969

G. J. LUKAS ET AL 3,455,163

LIQUID LEVEL GAUGE

Filed Sept. 26, 1967

INVENTORS
FLOYD J. BYDALEK
GUS J. LUKAS

BY Wheeler, Wheeler, House & Clemency
ATTORNEYS

INVENTORS
FLOYD J. BYDALEK
GUS J. LUKAS
BY Wheeler, Wheeler, House & Clemency
ATTORNEYS July 15, 1969
G. J. LUKAS ET AL
3,455,163
LIQUID LEVEL GAUGE
Filed Sept. 26, 1967
4 Sheets-Sheet 3
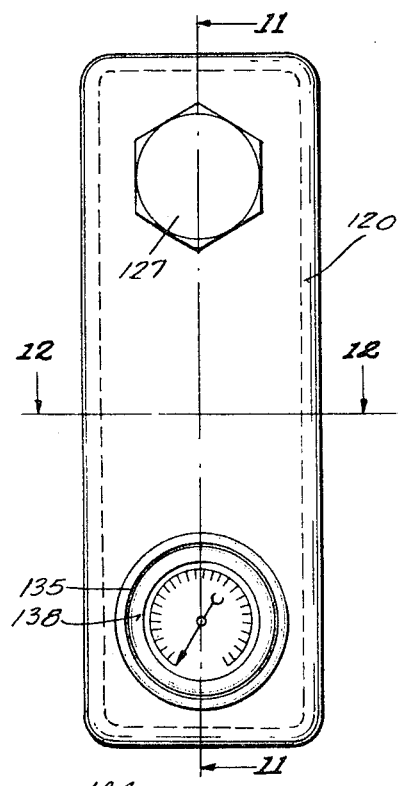
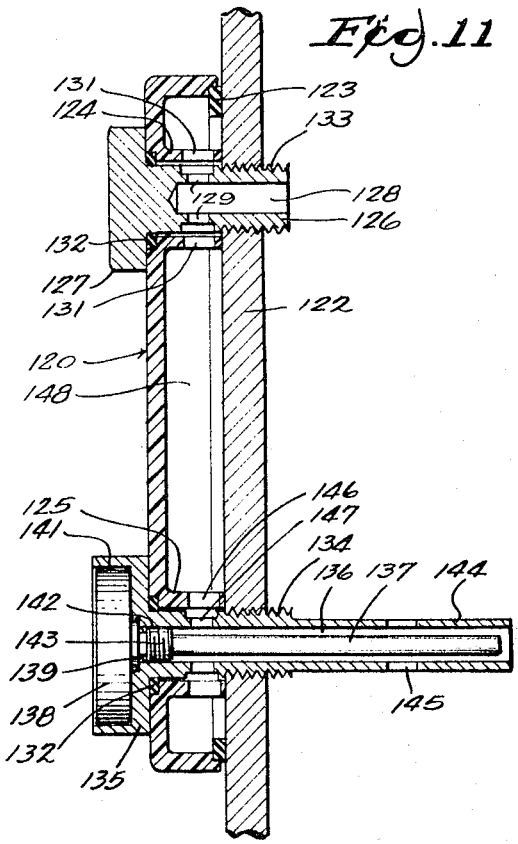
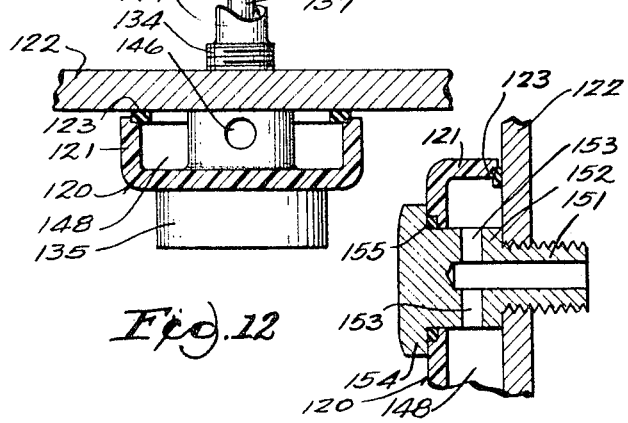
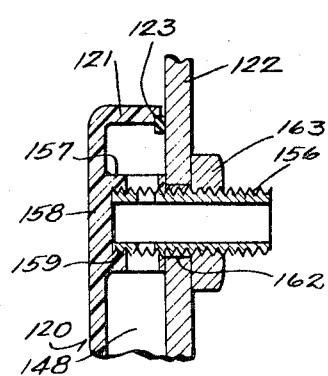
INVENTORS
FLOYD J. BUDALEK
GUS J. LUKAS
BY Wheeler, Wheeler, House & Clemency
ATTORNEYS July 15, 1969  G. J. LUKAS ET AL  3,455,163
LIQUID LEVEL GAUGE
Filed Sept. 26, 1967  4 Sheets-Sheet 4
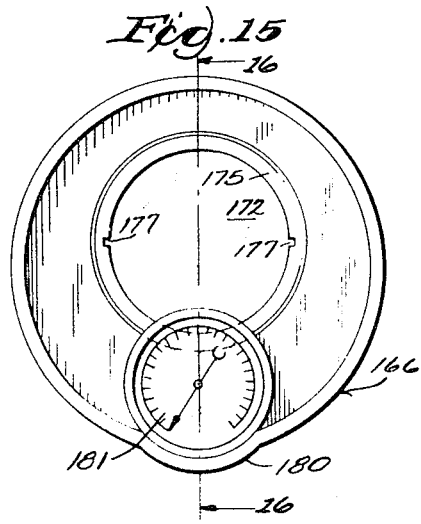
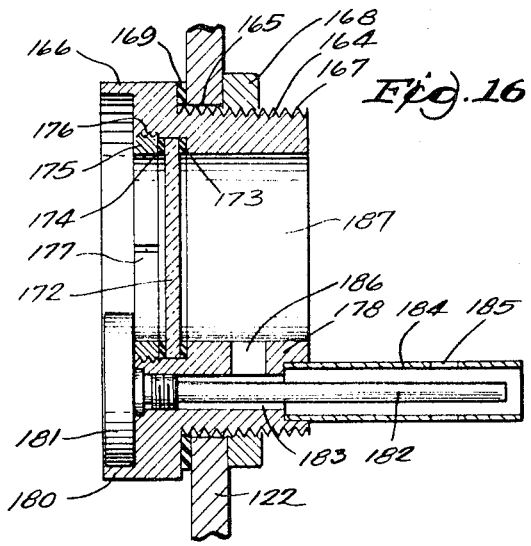
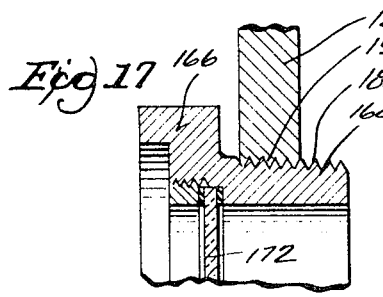
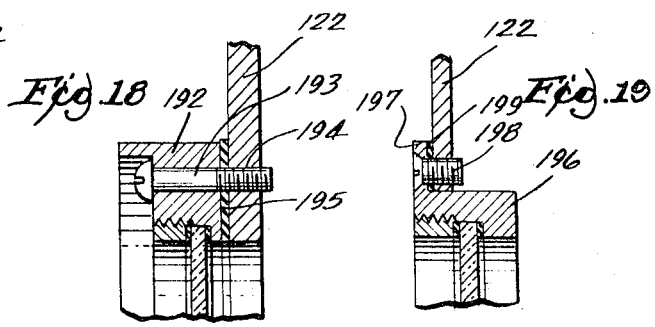
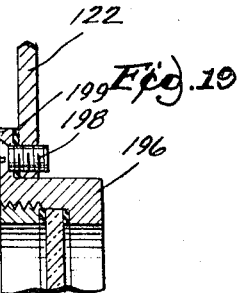
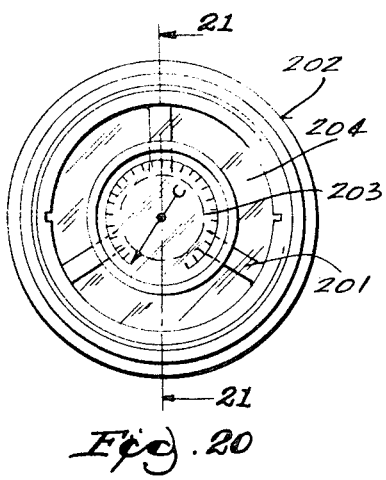
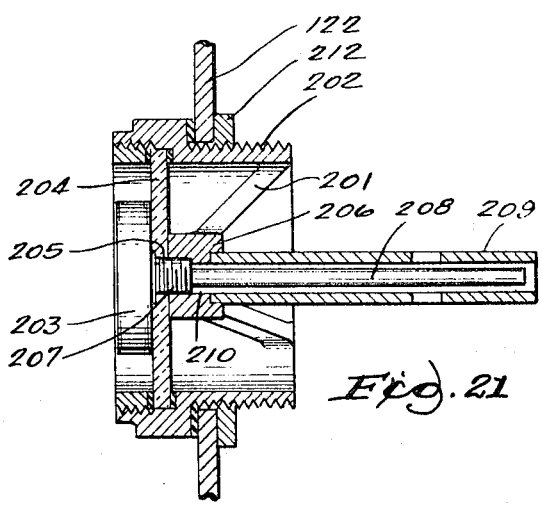
INVENTORS
FLOYD J. BYDALEK
GUS J. LUKAS
BY Wheeler, Wheeler, House & Clemency
ATTORNEYS United States Patent Office 3,455,163
Patented July 15, 1969

3,455,163
LIQUID LEVEL GAUGE
Gus J. Lukas and Floyd J. Bydalek, Manitowoc, Wis., assignors to Lube Devices, Inc., Manitowoc, Wis., a corporation of Wisconsin
Continuation-in-part of application Ser. No. 407,710, Oct. 30, 1964. This application Sept. 26, 1967, Ser. No. 670,696
Int. Cl. G01f 23/22
U.S. Cl. 73—292                          13 Claims

ABSTRACT OF THE DISCLOSURE

This disclosure relates to a combination liquid level gauge and dial thermometer adapted to be mounted on a tank and in which the dial thermometer is mounted on the front of the gauge and has a sensing stem projecting rearwardly therefrom through an opening in the gauge and into the tank liquid.

Cross reference to related application

This application is a continuation-in-part of our copending application Ser. No. 407,710, filed Oct. 30, 1964, and now abandoned.

Summary of the invention

The gauge of the present invention is intended in many instances to be "flush" mounted against the wall of the reservoir to which it is attached. Accordingly, there will be no apparent space between the gauge body and the reservoir wall. The gauge will "hug" the wall and present a more attractive appearance than has heretofore been achieved in liquid level gauges. As it does not project as far from the reservoir wall as prior art gauges, it is less subject to damage, etc.

An important feature of the invention is provision for a dial thermometer which is removable mounted on the gauge body. In some embodiments, the mounting bolts for the gauge body are hollow to provide for liquid passage between the reservoir and the gauge. In some embodiments, the thermometer has a sensing stem which desirably extends through one of the hollow mounting bolts to be exposed directly to the liquid within the reservoir. The construction desirably is such that the thermometer can be removed and replaced by a blind plug, if desired. In all cases, the gauge body has an opening at its front over which is mounted the housing for the dial thermometer, and the thermometer has a sensor at its back which is exposed through said opening to the liquid. Accordingly, both the level and temperature of the liquid is readable at a glance by a simple observation of the combination instrument.

In certain embodiments of the invention, the gauge is back mounted, that is to say, the mounting bolts have their heads inside of the reservoir and have shanks which are threaded into the back wall of the gauge body. Accordingly, no bolt heads, etc. are visible to the observer. Such a gauge presents a "clean," compact and uncluttered appearance. It has minimum projection from the reservoir.

In some embodiments of the invention, the gauge body is vertically elongated and the sight comprises a transparent tube removably seated in the body. In other embodiments, the body has a sight plate fixed thereto. In still other embodiments, the body may be made of transparent material which integrally provides a sight.

An important feature of some back mounted gauges embodying the present invention is the provision for a relatively deep gauge body back wall having relatively deep threaded openings therein to accept the threaded shanks of the back mounting bolts. This is achieved without unduly enlarging the size of the gauge over-all by offsetting the sight glass cavity forwardly in the body so that the front and side walls of the body are thinner than the back wall. If the sight glass cavity were centered in the gauge body, the gauge would have to be made much larger to provide an adequately thick back wall.

Sight gauges of some embodiments of the present invention also are characterized by forming the sight glass cavity longitudinally completely through the body of the gauge and through the ends thereof so that sight glass can be inserted and withdrawn from the body endwise. After the sight glass is positioned, the ends of the cavities are closed with end plugs. Accordingly, removal of an end plug permits withdrawal of the sight glass axially through the open end of the body, even when the gauge is mounted on the reservoir, without requiring that the gauge be first disassembled from the reservoir.

Other objects, features and advantages of the present invention will appear from the disclosure.

Detailed description of the drawings

FIG. 10 is a front view of a modified embodiment of the invention in which the gauge body is made of transparent material integrally providing the sight.

FIG. 11 is a vertical cross section taken along the line 11—11 of FIG. 10.

FIG. 12 is a lateral cross section taken along the line 12—12 of FIG. 10.

FIG. 13 is a fragmentary vertical cross section taken through a modified embodiment of the gauge shown in FIG. 10.

FIG. 14 is a fragmentary vertical cross section taken through another modified embodiment of the gauge shown in FIG. 10.

FIG. 15 is a front elevation of another modified embodiment of the invention in which the gauge body is in the form of a tubular plug.

FIG. 16 is a vertical cross section taken along the line 16—16 of FIG. 15.

FIG. 17 is a fragmentary vertical cross section taken through a modified embodiment of the gauge of FIG. 15.

FIG. 18 is a fragmentary vertical cross section taken through another modified embodiment of the gauge shown in FIG. 15.

FIG. 19 is a fragmentary vertical cross section taken through another modification of the gauge shown in FIG. 15.

FIG. 20 is a front elevation of another modified embodiment of the invention.

FIG. 21 is a vertical cross section taken along the line 21—21 of FIG. 20.

Preferred embodiments of the invention

Figure 1:
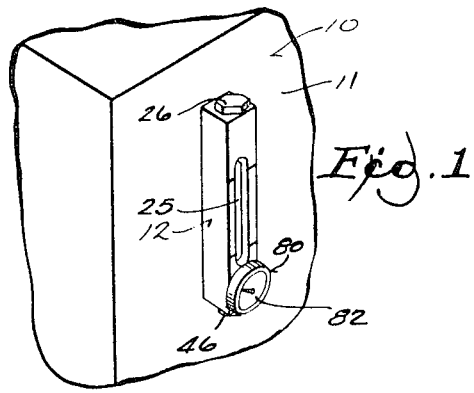
FIG. 1 is a perspective view of a liquid level gauge embodying the invention, back mounted on a reservoir.

Although the disclosure hereof is detailed and exact to enable those skilled in the art to practice the invention, the physical embodiments herein disclosed merely exemplify the invention which may be embodied in other specific structure.

Like parts in the several views are given the same reference characters.

Figure 4:
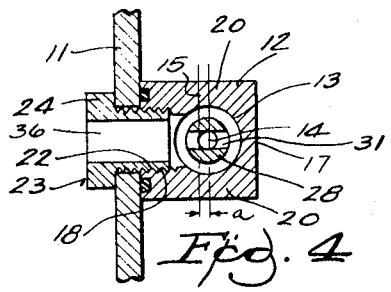
FIG. 4 is a cross section taken along the line 4—4 of FIG. 3.

Gauges embodying the present invention are typically mounted on the wall 11 of a liquid reservoir 10. In the embodiment of FIGS. 1–8, the gauge body 12, typically aluminum and square in transverse cross section, is provided with a longitudinally extending sight or sight glass cavity 13 which is formed by boring or the like completely through the body 12 and through the ends thereof. As best shown in FIG. 4, the axis 14 of the bore 13 is offset forwardly of the centerline or axis 15 of the body 12. The offset $a$ in a typical practical embodiment of the invention (where body 12 is ¾ inch square and bore 13 is ½ inch diameter) is approximately ⅛ inch. This means that the front wall 17 and side walls 20 of the body 12 are relatively thin (approximately ⅛ inch) while the back wall 16 is relatively thick (approximately ¼ inch).

The thickened back wall 16 is particularly important in the embodiment of the invention shown in FIGS. 1, 3, 4, 6, and 7 in which the gauge is back mounted. In this embodiment, the relatively thick back wall 16 is provided with threaded transverse opening at 18 near its top and bottom ends to receive the threaded shanks 22 of fasteners such as mounting bolts 23 which have enlarged heads 24 integral with their shanks 22. The thick wall 16 has sufficient depth to provide a sufficient number of threads to provide an adequate anchorage for the bolt shanks 22.

Figures 2, 3, 8:
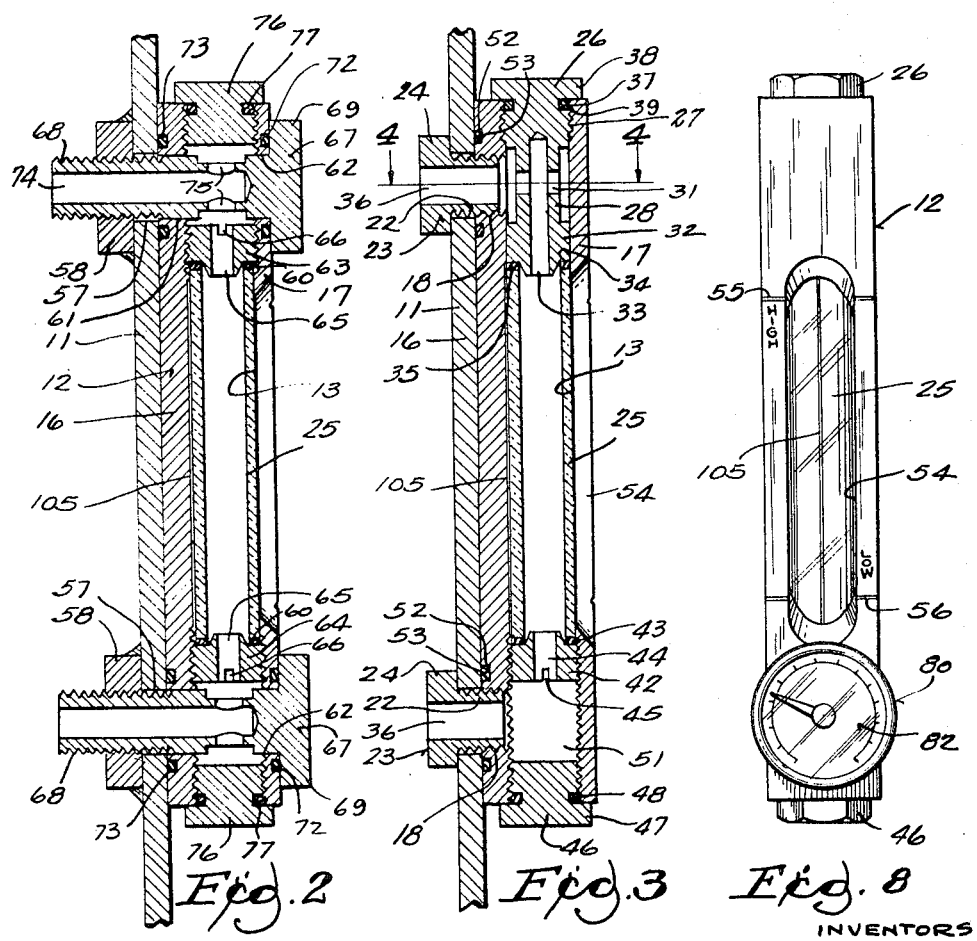
FIG. 2 is a vertical cross section taken through a front mounted liquid level gauge embodying the invention.
FIG. 3 is a vertical cross section taken through a back mounted liquid level gauge embodying the invention.
FIG. 8 is a front view of a back mounted liquid level gauge according to FIG. 3 and incorporating a thermometer per FIG. 6.

The sight glass cavity 13 receives a transparent sight or sight glass 25 which is inserted into the cavity 13 endwise. The top of the body 12 in the back mounted embodiment of FIG. 3 is closed by an end plug or cap 26 which has threads at 27 which mate with corresponding threads formed in body 12. Plug 26 has a narrow shank at 28 which is provided with a cross channel 31. Beyond shank 28, plug 26 has an enlarged plug portion 32 having an axial passage 33, communicating with cross channel 31. Plug 32 is provided with a shoulder 34 which bears on a gasket 35 which seats against the upper end of the sight glass 25.

Mounting bolts 23 are hollow to provide passages 36. Passage 36 in top bolt 23 communicates with passages 31, 33 in cap 26 to the interior of the sight glass 25. There is also a gasket seal 37 between the head 38 of the end plug 26 and a seat 39 therefor on the body.

At its bottom, the sight glass cavity 13 of the gauge is threaded from its outer end almost to the bottom end of the sight glass 25, thus to receive a threaded plug 42 which clamps a gasket 43 against the end of the sight glass 25. Plug 42 has an axial passage 44 and also has a screw driver slot 45 by which the plug may be manipulated.

The extreme bottom end of the sight glass cavity is closed by an end plug 46 having a head 47 which clamps against the gasket 48 having a seat provided on the end of the body 12. Accordingly, there is a cavity 51 of substantial size between the plugs 46, 42 in liquid type communication with the sight glass through passage 44 of plug 42 and with the interior of the reservoir through passage 36 in the back mounting bolt 23.

It is desirable that the back mounting bolts 23 have integral heads 24 and shanks 22 and that the length of the shank be made such that it will be just slightly less than the combined thicknesses of the reservoir wall 11 and thickened back wall 16 of the gauge body 12. Accordingly, the end of the shank 22 opposite head 24 will not project into the sight glass cavity but will have sufficient axial extent to adequately connect with the back wall 16.

The back wall 16 is also provided with annular seats 52 about their threaded openings 18, 19 within which are received gaskets 53 which are clamped under pressure of the bolts 23 when these are tightened, thus to seal the gauge body to the reservoir wall and preclude leakage about bolt shanks 22.

The front wall 17 of the body is cut away at 54 to expose the sight glass 25 to view for observation of the liquid level in the reservoir. If desired, indicia marks 55 and 56 may respectively be provided on the front face of the gauge body, as shown in FIG. 8, and the legends "high" and "low" may be inscribed on the face adjacent said indicia marks 55, 56.

Bottom end plug 46 may readily be removed from the gauge to provide for draining the sight glass when desired. In order to remove the sight glass 25, its lowermost plugs 46 and 42 may readily be removed, and the sight glass 25 withdrawn axially downwardly. Alternatively, the top plug 26 may be removed and the sight glass withdrawn axially upwardly. In any event, the shanks of the mounting bolts 23 do not extend into the cavity so as not to interfere with the removal of the sight glass. Accordingly, the gauge need not be disassembled from the reservoir in order to remove the sight glass.

The FIG. 3 back mounted construction can be used only when the liquid reservoir 11 has a removable access plate or the like through which access to the bolts 23 can be had from inside the reservoir. Inasmuch as a large percentage of reservoirs are provided with such access plates, the FIG. 3 construction is well adapted for most installations. Because nothing projects forwardly of the front of the gauge body, and the body is flush mounted on the wall 11, the gauge of FIG. 3 has minimum projection from the reservoir.

The construction shown in FIG. 2 is adapted for installation on reservoirs which do not have such access plates. In this construction, the wall 11 of the reservoir is initially provided with openings 57 and jam nuts 58 are welded or otherwise secured to the inside of wall 11 in registry with the openings 57. In this construction, the gauge is substantially the same as in the FIG. 3 construction except that its mounting bolts are removable from the front rather than from the back of the wall 11.

The sight glass cavity 13 extends longitudinally completely through the body 12 as in the FIG. 3 construction. The back wall 16 of the body is provided with unthreaded through openings 61 which register with the openings 57 in the wall 11. The front wall 17 of the body 12 in this embodiment is provided with unthreaded through openings 62 which align with openings 61, 57.

The sight glass 25 is received axially through one or the other of the ends of the body 12 and is retained in place by threaded plug 63 near the top of the gauge and by threaded plug 64 near the bottom of the gauge. The bore 13 is threaded between the ends of the sight glass 25 and the ends of the bore to accept the plugs 63, 64. Plugs 63, 64 are provided with axial passages 65 and with screw driver slots 66. Plugs 63, 64 clamp sealing gaskets 60 against the ends of the sight glass, as in the embodiment of FIG. 3.

The plugs 63, 64 are positioned clear of fasteners such as mounting bolts 67 which respectively have shanks 68 which are threaded near their ends remote from their enlarged heads 69, in order to engage with the jam nuts 58. The heads bear on gaskets 72 and also clamp gaskets 73. The shanks 68 of the mounting bolts 67 are provided with axial passages 74 and lateral passages 75 to provide continuous communication from within the reservoir 10 to the sight glass 25 through the axial passages 65 in plugs 63, 64.

The ends of the body 12 distally beyond the bolts 67 are closed by caps 76 which have a threaded connection with the body 12 and are in pressure contact with the gaskets 77.

The sight glass in the embodiment of FIG. 2 can be removed only if one or the other of the mounting bolts 67 is removed, thus to clear the sight glass bore 13 and permit removal of one or the other of the plugs 63, 64 and one or the other of the caps 76 for axial withdrawal of the sight glass 25. Bottommost cap 76 is removable for drain purposes.

Figure 5:
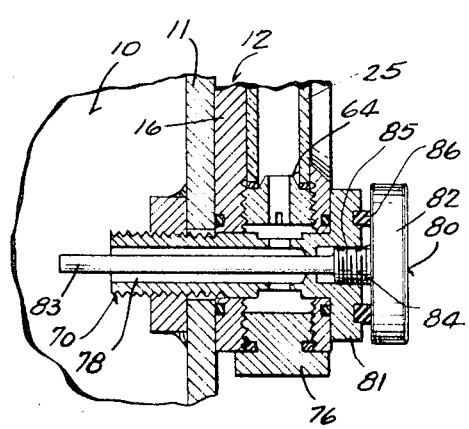
FIG. 5 is a fragmentary vertical cross section taken through a front mounted gauge such as the one shown in FIG. 2 and in which a thermometer is incorporated in the lower part of the gauge.

FIG. 5 shows a modification of the FIG. 2 construction in which the mounting bolt 67 at the bottom of the body 12 is replaced by a somewhat similar mounting bolt 70 in which, however, the liquid passage 78 extends completely through the bolt shank and its head 81. A thermometer 80 having a dial face housing 82 and a sensor such as an axially extending sensing stem 83 is provided in this embodiment. Any temperature indicator may respond to the temperature sensed by stem 83. The dial illustrated herein is a typical embodiment. The sensing stem 83 extends through the bolt passage 78 to the inside of the reservoir 10 to be directly responsive to the temperature of the liquid therein. The thermometer dial housing 82 is provided with a threaded stud 84 which engages a threaded portion 85 of the passage 78 through the bolt. A gasket 86 between the bolt head 81 and the dial housing 82 seals the construction against loss of liquid. In all other particulars the construction is the same as shown in FIG. 2 and similar reference characters for like parts are applied thereto.

Figure 6:
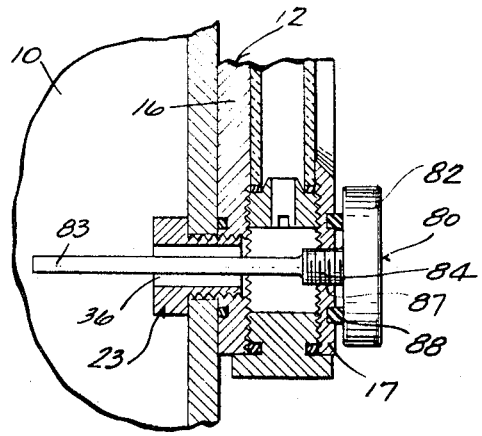
FIG. 6 is a fragmentary vertical cross section taken through a back mounted gauge such as shown in FIG. 3 and having a thermometer incorporated in the lower part of the gauge.

FIG. 6 shows the back mounted embodiment of FIG. 3 modified to accept the thermometer 80. Its sensing stem 83 extends into the reservoir 10 through the axial passage 26 in the lowermost back mounting bolt 23. The front wall 17 of the body 12 is provided with a threaded opening or counterbore 87, and the mounting stud 84 of the dial face housing 82 is screwed thereinto. The thermometer is sealed by a gasket 88 under pressure of the housing 82. If the thermometer 80 is no longer required, it may simply be removed and a blind plug or cap substituted for the thermometer housing 82 with its stud 84.

Figure 9:
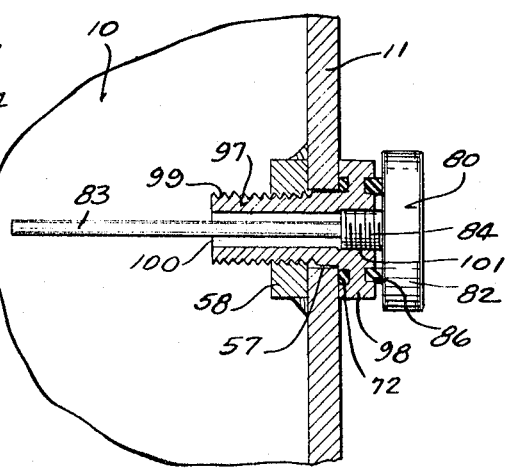
FIG. 9 is a fragmentary cross section showing the thermomter mounted in the wall of the reservoir, independently of the gauge.

As shown in FIGS. 5, 6 and 9, the thermometer sensing stem 83 is at least partially within the hollow shanks of bolts 70, 23, 97. These shanks form a protective shield about the enclosed portions of the stem 83.

Figure 7:
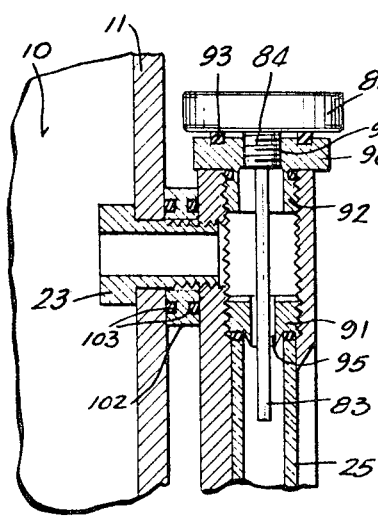
FIG. 7 shows a modification of the back mounted gauge in which the thermometer is mounted axially in the sight glass.

FIG. 7 shows a thermometer location modification, as applied to the back mounted construction of FIG. 3, for installations where it is undesirable to have the thermometer sensing stem 83 extend into the reservoir 10. An example would be when there is stirring apparatus in the reservoir. In such an instance, the sight glass cavity is threaded inwardly to a point adjacent the end of the sight glass, as in FIG. 2, and the top cap or plug 26 is replaced by an inner plug 91 (similar to plug 63 of FIG. 2), and by an outer plug or cap 92 having a head 90 with a threaded opening 94. As in the previously described embodiments, the thermometer housing 82 has a stud 84 threaded into the threaded opening 94 provided in the head 92. Housing 82 clamps gasket 93 against head 90 for sealing purposes. The thermometer stem 83 extends downwardly through an axial passage 95 in the plug 91 and into the sight glass 25 to sense the temperature of the liquid therein. In the event thermometer dial housing 82 has a diameter greater than cap 92, as shown in FIG. 7, gauge body 12 is spaced away from reservoir wall 11 by spacer washers, the upper such being shown at 102 in FIG. 7. Suitable gaskets 103 are provided and bolts 23 are made slightly longer than those shown in FIG. 3. In all other particulars the structure is the same as shown in FIG. 3, and similar reference characters are applied thereto.

FIG. 9 shows how the thermometer 80 can be mounted in the reservoir independently of any gauge. The reservoir wall 11 has an unthreaded opening 57 and a jam nut 58, as in FIG. 2. The threaded shank 99 of a mounting bolt 97 is inserted through the opening 57 and threaded into nut 58. Head 98 clamps against gasket 72. Bolt 97 has an axial passage 100 to receive the thermometer stem 83. Dial housing 82 has stud 84 threaded into counterbore 101 of the bolt 97. Housing 82 clamps gasket 86 against the bolt head 98. As in previously described embodiments of the invention, the thermometer can be removed and replaced by a blind plug or cap.

The gauge body 12 may also be inscribed with a line 105 which may be colored red or the like and which gives good color contrast with the liquid in the sight glass for clear visibility of the liquid level.

As is conventional, the sight glass may be made of lime glass, heat resistant boro silicate glass, such as Pyrex, plastic or any other suitable transparent material.

FIGS. 10 through 14 show various forms of a modified embodiment in which the gauge body 120 comprises a shell of transparent material which integrally provides the sight through which the liquid level in cavity 148 is visually observed. Shell 120 has integral side walls or flanges 121 in confronting relation to tank wall 122 and sealed by intervening frame gasket 123 against the wall 122 of the tank. In this embodiment the face of sight 120 defines the front of the body and a plane through the rear edges of flanges 121 defines the back of the body.

In the embodiment of FIGS. 10 through 12, the gauge body 120 is front mounted on the tank wall 122. Body 120 is provided near the top and bottom of cavity 148 with respective upper and lower tubular bosses 124, 125. The upper boss provides for passage of a hollow fastener or bolt 126 having a hexagonal head 127 which bears on the front of body 120 through sealing gasket 132. The shank of the fastener 126 is provided with an axial passage 128 communicating with the tank interior. Passage 128 has lateral ducts 129 which align with corresponding ports 131 in the walls of the boss 124.

In the embodiments shown in FIGS. 11, 12 and 13, shank 126 of the hollow fastener is provided with external threads 133 which engage corresponding threads tapped into an aligned opening in wall 122. Where the wall is thin, as in FIG. 14, the wall simply has an opening and the fastener threads engage a nut on the inside face of the tank wall. This nut can be separate from the fastener shank, or integral therewith, as shown in FIGS. 3 and 7. In any event, the nut can be regarded as a "head" on a bolt, the shank of which extends through the wall opening.

The lower end of the gauge body 120 is fastened to the tank wall 122 by a structure similar to that at the top. Hollow fastener or bolt 134 has external threads which engage corresponding threads in an opening in wall 122. Bolt 134 extends through the tubular boss 125 and has a head 135 sealed to the front body 120 against gasket 132. Fastener 134 has a hollow interior passage or bore 136 to receive the temperature sensor or stem 137 of a dial face thermometer which has a housing 138 from which the sensing stem 137 projects rearwardly. In this embodiment of the invention, bolt head 135 has a recess 141 in which the dial housing 138 is sheltered. Bore 136 is internally threaded at 142, and the sensing stem 137 has a threaded shoulder 143 engaged therewith. There is also a gasket 139 to seal the thermometer and prevent escape of liquid from the gauge.

Hollow fastener 134 is provided with an integral sheath 144 disposed about the sensing stem 137. Sheath 144 desirably has cross openings 145 for admission of liquid.

The boss 125 has lateral ducts 146 which align with corresponding lateral ducts 147 in the hollow fastener 136. Accordingly, there is closed circuit communcation between the cavity 148 within the gauge body and the interior of the tank. This is similar to the gauge structure shown in FIGS. 1 through 8, in which there is also closed circuit communication between the gauge body and the tank.

The tubular bosses 124, 125 strengthen the gauge body 120 in the vicinity of the mounting bolts and support the front wall of the gauge body against clamping pressure applied to the body when the bolts are tightened.

FIG. 13 illustrates a modification in which the bosses 124, 125 are omitted. In this construction hollow fastener 151 is provided with an enlarged shoulder 152 through which lateral ports 153 lead into the cavity 148. The enlarged head 154 of the fastener is sealed to the gauge body by a gasket 155. Tightening pressure of the fastener on the face of body 120 is contained by the shoulder 152.

FIG. 14 illustrates a back mounted version of this embodiment of the invention. Tubular boss 157 has a closed or blind front wall 158, and an internal thread 159. Hollow fastener or bolt 156 is threaded from the rear through a suitable clear opening 162 in the wall 122 and is threaded into the threads 159. A nut 163 is advanced on the fastener 156 to clamp the flange 121 of the gauge body 120 against gasket 123 and tank wall 122.

FIGS. 15 through 21 show several other modifications in which the gauge body is in the form of a tubular plug which is received within a similarly shaped opening in the tank wall 122. In these embodiments the tank wall has only a single opening, and all parts of the gauge and thermometer are built into the plug which fills the opening. The sight is centrally within the plug and is surrounded by the tubular wall of the plug. In FIG. 16 the plug 164 fits into tank wall opening 165. Plug body 164 has an enlarged head 166. In the back mounted embodiment shown in FIG. 16, body 164 has external helical threads 167, and the body is clamped to the wall 122 and intervening gasket seal 169 by a back mounted nut 168. In this embodiment the entire gauge body is in the form of a hollow fastener or bolt which fits as a unit into the tank wall opening.

The sight comprises a glass or plastic window 172 held in a suitable countersunk body recess between sealing gasket 173, 174 by a retainer ring 175 threaded into recess 176 countersunk into head 166. Ring 175 is desirably provided with edge sockets 177 by which the ring is tightened by a suitable spanner wrench.

Tubular wall of plug 164 has varying thicknesses around its circumference. It is thinner near its top than near its bottom 178. Opening 183 is formed through bottom 178 to pass the sensing stem 182 of the dial face thermometer from the rear of the dial face housing 181 into the tank. The stem 182 is desirably protected with a sheath 184 through which liquid cross passages 185 are formed. Dial face housing 181 is desirably recessed within the peripheral rim 180 of body 166. Bottom portion 178 of body 164 is also provided with a lateral duct 186 into opening 183 and through which liquid will circulate into the body cavity 187 behind the sight 172.

FIG. 17 shows a modification in which the plug body body 164 is provided with pipe threads 188 threaded into corresponding pipe threads 191 formed in the opening through wall 122. In other particulars the structure is similar to FIG. 16.

FIG. 18 shows another modification in which the body 192 has no portion extending through a wall opening or inside of the tank but is held to the tank wall 122 by a series of bolts 193 threaded into tapped holes 194 in the wall 122. A gasket 195 is compressed between the body 192 and the wall 122. In other particulars the structure is similar to FIG. 16.

FIG. 19 shows another embodiment in which the body 196 is almost entirely recessed within the tank. In this embodiment the body 196 has a relatively thin external flange 197 clamped to the wall 122 and intervening sealing gasket 199 by several bolts 198. In other particulars the structure is similar to FIG. 16.

In the embodiments of FIGS. 15 through 19 the dial face housing is seated against the front of plug body 164. The rear edge of the tubular wall of plug 164 defines the back of the plug body. In these embodiments the body also functions as a hollow fastener by which the gauge is mounted on the tank wall.

FIGS. 20 and 21 illustrates another modification of the plug type of gauge in which the gauge body 202 has substantially uniform thickness throughout its circumference and in which the dial thermometer housing 203 is mounted at the center of the sight 204. Sight 204 is provided with a central opening 205 aligned with the hub 206 of a mounting spider 201. Hub 206 has a through opening 210 through which the sensor or stem 208 of the thermometer extends rearwardly from the housing 203 into the tank. The hub 206 and stem 208 are threaded at 207. Stem 208 is protected within a sheath 209.

In the embodiment shown in FIG. 21, there is a back mounted nut 212 which fastens the gauge body onto the tank wall 122. However, other various mounting modifications, such as those suggested in FIGS. 17 through 19, could be substituted for the specific structure shown in FIG. 21.

The various plug type embodiments shown in FIG. 15 through 21 are compact, yet they provide ample visual indication both of liquid level and temperature. In these embodiments the sight 204 is at the front of the body 202, the back of which is defined by the rear edge of the tubular wall 202. Wall 202 also functions as a hollow fastener to mount the gauge on the tank wall. The opening 210 through spider hub 206 constitutes an internal passage through the hollow fastener.

What is claimed is:

1. A liquid level gauge comprising:
    a vertically elongated body substantially square in cross section and having a back side adapted for flush engagement with a reservoir wall and a front side away from said wall,
    a sight cavity longitudinally in said body,
    said cavity being offset from the longitudinal central axis of said body away from said back side and toward said front side to leave said body relatively thick adjacent said back side and relatively thin adjacent said front side,
    relatively deep threaded openings in said relatively thick back side near the respective ends of the body,
    and threaded fasteners adapted to be inserted from inside said reservoir through registering openings in the reservoir wall and into the relatively deep threaded openings in the back side of the body to back mount the gauge to the reservoir.

2. The gauge of claim 1 in which the sight cavity extends completely through at least one end of said body, a sight therein and an end plug at the said one end thereof, said end plug being removable for withdrawal of the sight endwise of the body without demounting the guage from the reservoir.

3. The gauge of claim 1 in which said threaded fasteners comprise bolts with shanks, said shanks having a length no greater than the combined thickness of the reservoir wall and the back side of the gauge body flush mounted thereto whereby said shanks do not extend into the sight cavity when the gauge body is back mounted on the reservoir wall.

4. A liquid level gauge comprising an elongated body, a sight glass cavity longitudinally completely through at least one end of said body, a sight glass in said body and having one end spaced inwardly from said one end of the body, an end plug at said end of the sight glass to close the cavity at said one end of the body, said end plug being removable to permit withdrawal of the sight glass through said one end of the body, said body having transverse openings through a side of the body near its ends and communicating with the sight glass cavity near its ends, mounting fasteners in said openings and extending transversely from said body, said fasteners being provided with liquid passages therethrough, and a thermometer having a sensing stem extending through the liquid passage of one of the fasteners into the reservoir.

5. A liquid level gauge comprising:
    an upright elongated body, a sight glass cavity longitudinally completely through at least one end of the body, a sight glass in said cavity and having a lower end spaced from the bottom end of the body, an end plug closing said one end of the body beyond the end of the sight glass, a transverse opening through one side of the body between the lower end of the sight glass and the bottom end of the body, a hollow fastener in said opening, and a thermometer having a sensing stem extending transversely from the gauge body through the hollow fastener.

6. The gauge of claim 5 in which the body has a second transverse opening in the other side of the body aligned with the transverse opening first mentioned, said sensing stem extending through said second transverse opening, said thermometer having a temperature indicator at the end of said sensing stem.

7. The gauge of claim 5 in which the hollow fastener has a protective shield at least partially about said sensing stem.

8. A combination liquid level gauge and dial thermometer for measuring the level and temperature of liquid in a tank, said gauge comprising a gauge body having a transparent sight through which the liquid level in the tank is visible, a dial thermometer having a dial face housing and a temperature sensor at the rear thereof, said thermometer having its dial face housing mounted on the front of the body, said body having an opening through which said sensor is exposed to the liquid, said body being vertically elongated, said opening being near the bottom of the body, a hollow fastener in said opening to mount the body on the tank, said sensor comprising a stem extending into said hollow fastener, said body having another opening near its upper end and a hollow fastener in said other opening, said hollow fasteners providing closed circuit communication between the gauge and the tank.

9. A combinatian liquid level gauge and dial thermometer for measuring the level and temperature of liquid in a tank, said gauge comprising a gauge body having a transparent sight through which the liquid level in the tank is visible, a dial thermometer having a dial face housing and a temperature sensor at the rear thereof, said thermometer having its dial face housing mounted on the front of the body, said body having an opening through which said sensor is exposed to the liquid, said gauge body comprising a shell of transparent material which integrally provides said sight, said shell having an integral peripheral flange in confronting relation to the tank, and a sealing gasket between said flange and tank.

10. A combination liquid level gauge and dial thermometer for measuring the level and temperature liquid in a tank, said gauge comprising a plug body comprising a transparent sight through which the liquid level in a tank is visible and a tubular wall surrounding said sight, an opening through said body, a dial thermometer having a dial face housing and a temperature sensor at the rear thereof, said thermometer having its dial face housing mounted on the front of the body over said opening with its sensor exposed to the liquid through said opening, said wall being circular and having external threads to constitute a mounting bolt for the gauge.

11. A combination liquid level gauge and dial thermometer for measuring the level and temperature of liquid in a tank, said gauge comprising:

a gauge body having a top, a bottom, a front, a back and a cavity, said body having a transparent sight through which liquid level in the cavity is visible, a dial thermometer having a dial face housing and a sensing stem projecting rearwardly therefrom, a hollow fastener for attaching the body to the tank, said hollow fastener having an internal passage opening into said cavity and into said tank, the front of the body having an opening aligned with the internal passage of said hollow fastener, said dial thermometer having its dial face housing mounted over said front opening and having its sensing stem extending rearwardly through said front opening through the body and through the hollow fastener.

12. The device of claim 11 in which said body is vertically elongated and has a hollow fastener near its top and having an internal passage opening into said cavity and into said tank, and means to seal the body to the tank.

13. The device of claim 11 in which said hollow fastener extends through the opening at the front of the body and has a head over said opening and against which said dial face housing is seated.

References Cited

UNITED STATES PATENTS

| | | | |
|---|---|---|---|
| 1,210,385 | 12/1916 | Hunziker | 73—323 |
| 1,570,938 | 1/1926 | Butler et al. | 73—292 |
| 2,045,507 | 6/1936 | Woodruff | 73—291 X |
| 2,743,613 | 5/1956 | Kebbon | 73—367 |
| 3,011,345 | 12/1961 | Kuck | 73—344 X |

LOUIS R. PRINCE, Primary Examiner

DANIEL M. YASICH, Assistant Examiner

U.S. Cl. X.R.

73—328